INVENTOR
HENRY G. R. WHITE

April 23, 1957     H. G. R. WHITE     2,789,436
THERMAL ERECTING DEVICE FOR GYROSCOPES Filed June 11, 1954     2 Sheets-Sheet 2

INVENTOR
HENRY G.R. WHITE
BY
ATTORNEYS

2,789,436

THERMAL ERECTING DEVICE FOR GYROSCOPES

Henry G. R. White, Winnetka, Ill., assignor, by mesne assignments, to the United States of America as represented by the Secretary of the Navy Application June 11, 1954, Serial No. 436,266

3 Claims. (Cl. 74—5.44)

This invention relates to erecting devices for gyroscopes and more particularly to a thermally actuated erecting device for a gyro-vertical.

A gyro-vertical is a gyroscope having an erecting device which causes the axis of the gyroscope to precess to a vertical position if displaced therefrom, and maintains this vertical position in spite of tendencies of the axis to tilt from its vertical position, such, for example, as may be produced by the rotaton of the earth.

Gyro-verticals are useful on board ships and other craft for providing a vertical reference from which information may be obtained to be compared with information from other sources in determining correct navigational information or information necessary for the correct operation of shipboard equipment such as guns. It is vital that the information obtained from a gyro-vertical to be used in this manner be accurate.

It is an object of this invention to provide novel and improved means for maintaining the attitude of a gyroscope rotor constant with respect to the earth.

Another object of this invention is to provide a novel thermal erecting device for gyroscopes, which erecting device is gravity sensitive and accurate.

Other objects and advantages of the invention will hereinafter become more fully apparent from the following description of the annexed drawings, which illustrate a preferred embodiment, and wherein.

Figure 1:
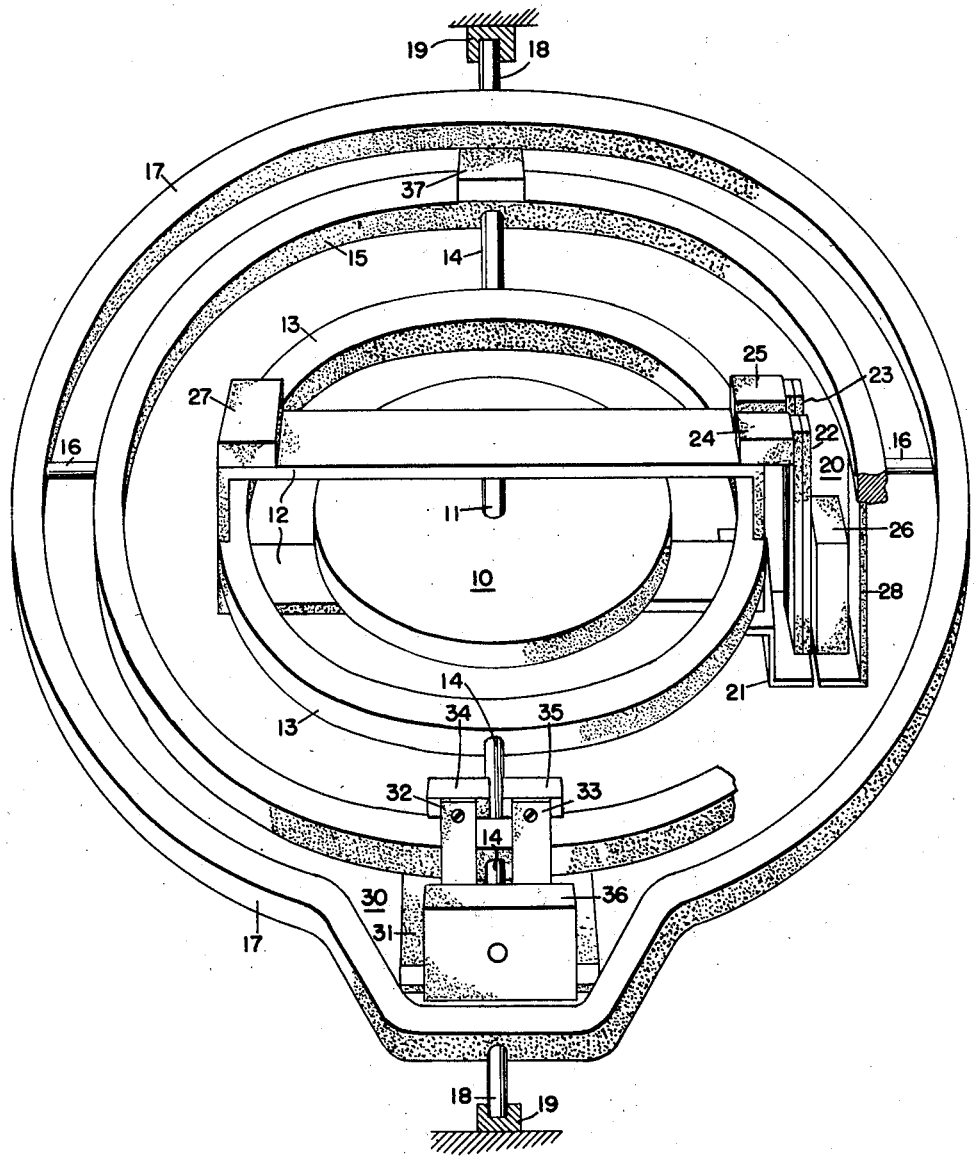
Fig. 1 is a view in perspective of a gyro-vertical incorporating the erecting device of this invention.

Referring now to the drawings, and more particularly to Fig. 1, the reference numeral 10 designates the rotor of a gyroscope which is mounted on a spin shaft 11. The spin shaft 11 is journaled for rotation on a bridge 12 which is supported by a housing 13. The housing 13 is mounted on a shaft 14, the shaft 14 being journaled for tilting on an inner gimbal ring 15. The inner gimbal ring 15 is mounted on a shaft 16 which is at right angles to the shaft 14 and also to the spin shaft 11, and the shaft 16 is journaled for tilting on an outer gimbal ring 17. The outer gimbal ring 17 is mounted on a shaft 18 which is parallel to the shaft 14 and which is journaled for tilting in fixed bearings 19.

The rotor is spun on the shaft 11 by any conventional means (not shown) such as an electric motor or an air stream and has three degrees of freedom by reason of its mounting on the shafts 14, 16 and 18. The spin axis is originally established in a vertical position, and in order to maintain this vertical position, gravity sensitive erecting devices 20 and 30 are provided.

The two erecting devices 20 and 30 are mounted on the gyroscope and are displaced from each other by ninety degrees about the spin shaft 11. The erecting device 20 comprises a supporting bracket 21 which is affixed to the lower portion of the bridge 12 to tilt therewith on the shaft 14. Two bimetallic elements 22 and 23 are affixed as their lower ends to the bracket 21 and support weights 24 and 25 respectively upon their upper ends. A container 26 is fastened to a second supporting bracket 28 which is affixed to the inner gimbal ring 15 to rotate therewith on the shaft 16. The container 26 is supported closely adjacent and facing the two bimetallic elements 22 and 23. A weight 27 is mounted on the housing 12 diametrically opposite the erecting device 20 to counterbalance the weight thereof.

The erecting device 30 is similar in structure to the device 20 and comprises a supporting bracket 31 which is affixed to the inner gimbal ring 15 and supports two bimetallic elements 32 and 33 which support weights 34 and 35 respectively upon their upper ends. A container 36 is mounted closely adjacent and facing the bimetallic elements 32 and 33 on an extension of the shaft 14 to rotate therewith. A weight 37 is mounted on the inner gimbal ring 15 diametrically opposite the erecting device 30 to counterbalance the weight thereof.

The bimetallic elements 22, 23, 32 and 33 are so arranged that as one of a pair receives more and the other of the pair less heat, they bend in the same direction. Changes in ambient temperature will cause the two elements of a pair to bend in opposite directions, and each will compensate for the movement of the other.

Figure 2:
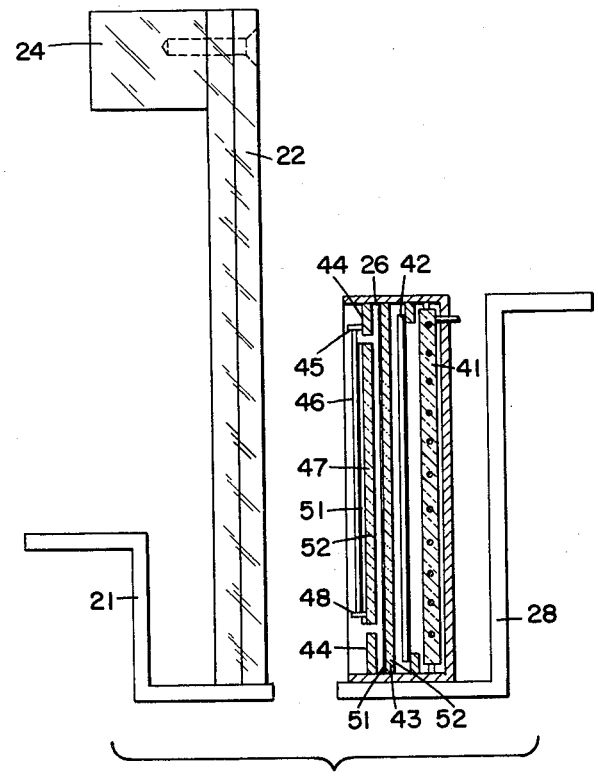
Fig. 2 is an elevational view, partially in section, of the erecting device of Fig. 1, the two major elements of the device being shown separated for clearness.
Figure 3:
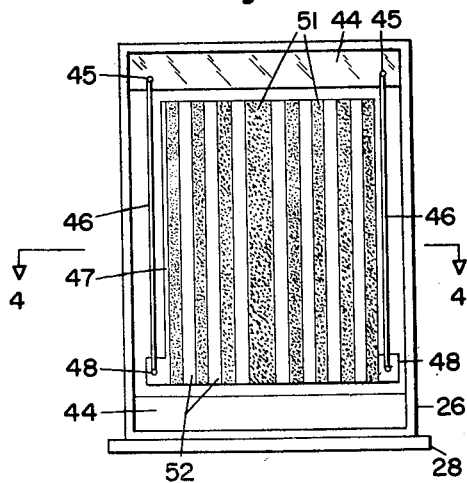
Fig. 3 is an elevational view of the housing and shutter elements of the erecting device of this invention.
Figure 4:
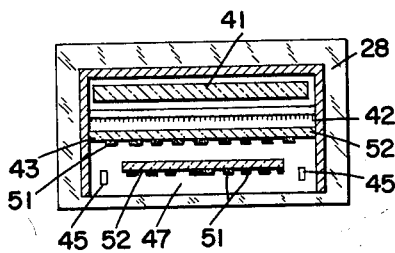
Fig. 4 is a sectional view taken on line 4—4 of Fig. 3.

Since the elements of the erecting devices 20 and 30 are similar in structure and in operation, only one will be described in detail. Referring now to Figs. 2, 3, and 4, the container 26 is open at the side which faces and closed at the side which is remote from the bimetallic elements 22 and 23. An electric heating element 41 positioned within the housing 26 adjacent the closed side is shown as a body of ceramic in which electrical resistance wire is imbedded, but it is to be understood that any conventional heating element may be used. Vertical louvers 42 are mounted in front of the heating element 41 to direct the heat radiated from the heater 41 into a series of parallel adjacent planes. A shutter element 43 which is affixed along its edges to the walls of the container 26 is mounted in front of the louvers 42. Frame members 44 are fastened along the upper and lower walls of the container 26 in front of the shutter element 43, and projecting from the upper frame 44 are two pins 45, each of which supports a thin metallic filament 46. A movable shutter element 47, carrying two pins 48 similar to the pins 45 to each of which is fastened the lower end of one of the filaments 46, is suspended inside the frame members 44. As can more clearly be seen from Fig. 3, the shutter elements 43 and 47 each comprises a series of vertically parallel opaque strips 51, spaced apart and supported by a body member 52. In the embodiment shown, the body member 52 is of glass or a similar material transparent to radiant heat which has been coated with a substance opaque to radiant heat and from which the coating has partially been removed to form a grid of alternate opaque and transparent lines. If desired, the coating may be reflective as well as opaque. An optical ruling machine may be used to form grids having a spacing of about 1/100 inch. The grids of Figs. 3 and 4 have been exaggerated in size and proportion to simplify the drawings.

The grids of the stationary and movable shutter elements 43 and 47 are so arranged that the shutter on both sides of its center is one-half open when the movable element 47 is in its central position, and that the movement of the movable element 47 in either direction opens one side and closes the other side of the shutter. This is accomplished by providing a widened strip in the center of one of the shutter elements 43 or 47, which widened strip is equal in width to the width of an even number of strips, so that the opaque portions of one half of that shutter element are of opposite phase from the opaque portions of the other half of that element. In this manner, as the movable shutter element 47 moves either to the right or to the left with respect to the stationary shutter element 43, one half of the shutter opens and the other half of the shutter closes.

*Operation*

For a discussion of the operation of the erecting device of this invention, let it be assumed that the rotor 10 is driven by a conventional means (not shown) such as a stream of air or an electric motor and that the rotor 10 spins in a horizontal plane and the spin shaft 11 is vertical. As the spin shaft 11 is tilted clockwise as viewed in Fig. 1, the container 36 is tilted from the vertical and the movable shutter element 47 in the container 36 is displaced from its mean position by gravity, closing one side of the shutter and opening the other side of the shutter. More heat reaches one of the bimetallic elements and less heat reaches the other of the bimetallic elements 32 and 33, and they bend together in response to the changes in their received heats and the resulting changes in their temperatures.

As the bimetallic elements 32 and 33 bend, the weights 34 and 35 are moved from their original positions and establish a moment about the shaft 16. This moment tends to rotate the rotor 10 on the shaft 16, but due to the gyroscopic action, the rotation is translated into motion about the shaft 14 to return the spin shaft 11 to the true vertical. As the spin shaft 11 is slowly righted, the movable shutter element 47 is also slowly returned to its mean position, equalizing the amount of heat reaching the bimetallic elements 32 and 33, which elements slowly return to their initial positions, removing the moment exerted about the shaft 16. Thus, as the spin shaft 11 returns to its vertical attitude, the forces returning it are gradually removed, until, when the shaft 11 is vertical, there is no longer any torque applied to cause the rotor 10 to precess.

As the spin shaft 11 deviates about the shaft 16 from its vertical position, or in a direction perpendicular to the plane of the paper as viewed in Fig. 1, the erecting device 20 responds to restore the shaft 11 to the true vertical in the same manner as described above with respect to the action of the erecting device 30. The erecting devices 20 and 30 will maintain the spin shaft 11 vertical regardless of the type of external forces applied to the rotor 10 to deflect the shaft 11 from the vertical.

The erecting device of this invention, although simple in its operation and structure, provides the accuracy necessary for navigation instruments and fire control apparatus. If shutter elements 43 and 47 are provided with grids having a spacing of one hundred to the inch, which spacing is readily obtainable with modern ruling machines, and a maximum swing to either side for the shutter element 47 is $\frac{1}{200}$ inch on a radius of one inch, the total angle through which the movable element 47 swings is 17 minutes. This means that the shutter is completely open on one side and completely closed on the other side of the wide center strip with a deflection of the spin shaft 11 of only 17 minutes. Actually, the erecting devices 20 and 30 would respond to a tilt of a fraction of the full deviation of the shutter element 47, and a restoring force would be applied to the rotor 10 long before the spin shaft is deflected as much as 17 minutes.

The erecting devices 20 and 30 may also be constructed with only one bimetallic element each, with a single weight mounted upon that single element, but the ambient temperature must be maintained constant or mechanisms to compensate for changes in ambient temperature must be incorporated into the erecting devices 20 and 30. The weights should all be mounted for adjustment so that the rotor 10 might be balanced fully. In another modification, a single source of heat, removed from the actual supporting structure of the rotor 10, may be used with appropriate reflectors to direct the heat to the bimetallic elements.

Obviously many modifications and variations of the present invention are possible in the light of the above teachings. It is therefore to be understood that within the scope of the appended claims the invention may be practiced otherwise than as specifically described.

What is claimed is:

1. In a self erecting gyro having a normally vertical spin axis mounted in structure providing opposed horizontal axes to allow for tilting of the gyro rotor by natural forces during use and wherein torque applying means is provided to precess the gyro rotor to erect the same to the normal spin axis, the improvement in torque applying means which comprises a counterbalance for each horizontal axis supported by said structure, each counterbalance including opposed weight means, adjusting means for each counterbalance, said adjusting means including independently movable bimetal elements fixed to one weight means of each counterbalance and said bimetal elements being arranged to compensate each other when subjected to the same temperature conditions, heating means positioned adjacent said bimetal elements, means between said heating means and said bimetal elements for directing greater amounts of heat to one bimetal element than to another in order to adjust said one weight means of a counterbalance by the combined action of the bimetal elements.

2. In a self erecting gyro having a normally vertical spin axis mounted in structure providing opposed horizontal axes to allow for tilting of the gyro rotor by natural forces during use, and wherein torque applying means is provided to precess the gyro rotor to erect the same to the normal spin axis, the improvement in torque applying means which comprises a counterbalance for each said horizontal axis and supported by said structure, each counterbalance including opposed weight means and one of said weight means being constructed of two generally similar weight members, adjusting means for each counterbalance, said adjusting means including a pair of compensating bimetal elements each of which is fixed to one of said similar weight members to independently actuate said members, heating means positioned in heat exchange relation with said bimetal elements and means between said heating means and said bimetal elements for directing differential amounts of heat to each of said bimetal elements when the gyro rotor tilts on one of its horizontal axes in order to adjust the similar weight elements.

3. The structure as in claim 2 further characterized by cooperating fixed and movable shutter means between the heating means and bimetal elements which under tilting action of the gyro rotor operates to cut off heat to one of the bimetal elements in order to adjust the similar weight elements relative to the other weight of the counterbalance.

References Cited in the file of this patent
UNITED STATES PATENTS

| | | |
|---|---|---|
| 1,773,172 | Davis | Aug. 19, 1930 |
| 2,499,238 | Wehrlin | Feb. 28, 1950 |